(12) United States Patent
Kashima et al.

(10) Patent No.: US 8,287,643 B2
(45) Date of Patent: *Oct. 16, 2012

(54) CLAD TEXTURED METAL SUBSTRATE FOR FORMING EPITAXIAL THIN FILM THEREON AND METHOD FOR MANUFACTURING THE SAME

(75) Inventors: Naoji Kashima, Aichi (JP); Shigeo Nagaya, Aichi (JP); Kunihiro Shima, Gunma (JP); Hirofumi Hoshino, Gunma (JP)

(73) Assignees: Chubu Electric Power Co., Inc., Aichi (JP); Tanaka Kikinzoku Kogyo K.K., Tokyo (JP)

( * ) Notice: Subject to any disclaimer, the term of this patent is extended or adjusted under 35 U.S.C. 154(b) by 1223 days.

This patent is subject to a terminal disclaimer.

(21) Appl. No.: 12/101,385

(22) Filed: Apr. 11, 2008

(65) Prior Publication Data

US 2008/0257255 A1  Oct. 23, 2008

(30) Foreign Application Priority Data

Apr. 17, 2007 (JP) ................................ P2007-108607

(51) Int. Cl.
*C30B 33/06* (2006.01)
*C30B 1/00* (2006.01)
*C30B 3/00* (2006.01)
*C30B 5/00* (2006.01)
*C30B 28/02* (2006.01)

(52) U.S. Cl. ..................................... 117/4; 117/1; 117/9
(58) Field of Classification Search .................. 117/1, 4, 117/9

See application file for complete search history.

(56) References Cited

U.S. PATENT DOCUMENTS

| 7,927,715 B2* | 4/2011 | Kashima et al. ............... 428/675 |
| 2003/0134749 A1* | 7/2003 | Onabe et al. .................. 505/100 |
| 2003/0144150 A1* | 7/2003 | Arendt et al. ................. 505/237 |
| 2005/0016759 A1* | 1/2005 | Malozemoff et al. ...... 174/125.1 |

FOREIGN PATENT DOCUMENTS

EP  1271666 A2  1/2003

OTHER PUBLICATIONS

Gladstone, T.A., J.C. Moore, B.M. Henry, S. Speller, C.J. Salter, A.J. Wilkinson, and C.R.M. Grovenor. "Control of Texture in Ag and Ag-alloy substrates for superconducting tapes"Department of Materials, University of Oxford, Supecond. Sci. Techno. 13(2000), pp. 1399-1407.

(Continued)

*Primary Examiner* — James McDonough
(74) *Attorney, Agent, or Firm* — Roberts & Roberts, LLP

(57) ABSTRACT

The present invention provides an oriented substrate for forming an epitaxial thin film thereon, which has a more excellent orientation than that of a conventional one and a high strength, and a method for manufacturing the same. The present invention provides a clad textured metal substrate for forming the epitaxial thin film thereon, which includes a metallic layer and a silver layer bonded to at least one face of the metallic layer, wherein the silver layer has a $\{100\}<001>$ cube texture in which a deviating angle $\Delta\phi$ of crystal axes satisfies $\Delta\phi \leq 9$ degree. The textured metal substrate can be manufactured by subjecting the silver sheet containing 30 to 200 ppm oxygen by concentration to the orienting treatment of hot-working and heat-treating, and bonding the metal sheet with the oriented silver sheet by using a surface activated bonding process.

4 Claims, 5 Drawing Sheets

OTHER PUBLICATIONS

Liu, D. et al; "Preparation and formation of cube textured Ag substrate for coating high-$T_c$ superconductor" Physica C 337 (2000) p. 75-78.

Ozawa, Shinji, et al "Low Distortion Cold Rolled Clad Sheets for PWB" Conference Proceedings of HDP'04. Jun. 3-Jul. 2004, pp. 91-96.

Gladstone, T.A., J.C. Moore, B.M. Henry, S. Speller, C.J. Salter, A.J. Wilkinson, and C.R.M. Grovenor. Department of Materials, University of Oxford, Supecond. Sci. Techno. 13(2000), pp. 1399-1407.

Gladstone, T.A., et al. "Control of Texture in Ag and Ag-Alloy Substrates for Superconducting Tapes." *Supercondd. Sci. Technol.* 13 (2000), pp. 1399-1407.

\* cited by examiner

Oxygen concentration: 10ppm     Oxygen concentration: 30ppm

CLAD TEXTURED METAL SUBSTRATE FOR FORMING EPITAXIAL THIN FILM THEREON AND METHOD FOR MANUFACTURING THE SAME

BACKGROUND OF THE INVENTION

1. Field of the Invention

The present invention relates to a textured metal substrate for forming an epitaxial thin film thereon and a method for manufacturing the same, and specifically relates to a textured metal substrate which is provided with a silver layer having a predetermined orientational structure, can make the thin film of high quality epitaxially grown thereon, and has a reliable strength, and a method for manufacturing the same.

2. Description of the Related Art

In recent years, a thin film produced while paying attention to characteristics of an epitaxial crystal structure is used in various fields. For instance, a superconducting thin film (formed of oxide superconducting material) having the epitaxial crystal structure is used in a superconducting conductor, a superconducting shield and the like, which are applied to various electric power units. However, the superconducting thin film having such an epitaxial crystal structure is inferior in workability, and has a defect of being hardly molded into a desired shape. For this reason, a superconductor of a shape suitable for a field of application is conventionally obtained by appropriately employing a necessary substrate for applying a superconducting material thereon, and epitaxially growing the superconducting film on the surface.

As such a substrate for forming an epitaxial thin film thereon, a clad textured metal substrate is used which has a $\{100\}<001>$ cube texture employs and is made from silver or a silver alloy (for instance, "Control of texture in Ag and Ag-alloy substrates for superconducting tapes" by T A Gladstone, J C Moore, B M Henry, S Speller, C J Salter, A J Wilkinson and C R M Grovenor, Department of Materials, University of Oxford, Supecond. Sci. Techno. 13(2000) 1399-1407, printed in the UK). Characteristics of a epitaxial thin film are affected by the orientation of composing crystals, and the crystal structure formed through epitaxial growth is affected by the orientation of the surface of the substrate. A substrate having excellent orientation can be easily obtained by appropriately adding working and heat treatment (recrystallization) to a silver-based metallic material.

However, a textured metal substrate for forming an epitaxial thin film made from the above described silver-based material has several problems. Particularly, a problem of the strength is pointed out. This is because the crystal structure of the textured metal substrate is formed basically by recrystallization, and a metal having a recrystallized structure cannot help decreasing the strength, which is general characteristics of a metallic material. It is hard to handle the substrate having poor strength when forming an epitaxial thin film thereon, because the substrate may be damaged.

In addition, a conventional silver-based substrate has not had a satisfactory orientational structure even though having it. The orientation of a substrate greatly affects the characteristics of the epitaxial thin film formed thereon, so that the substrate is required to have an orientation as adequate as possible.

The present invention has been accomplished based on the above described background, and is directed at providing the oriented substrate for forming an epitaxial thin film thereon which has a better orientation than that of a conventional one and a high strength, and a method for manufacturing the same.

SUMMARY OF THE INVENTION

The present inventors made an extensive investigation for solving the above described problems, and determined that the solving method is to employ a clad textured metal substrate having a two-layer structure to improve the strength, which comprises a silver layer of a substrate for growing an epitaxial thin film thereon and a metallic layer for supporting the silver layer.

Specifically, the present invention provides a clad textured metal substrate for forming the epitaxial thin film thereon, which includes a metallic layer and a silver layer bonded to at least one face of the metallic layer, wherein the silver layer has a $\{100\}<001>$ cube texture in which a deviating angle $\Delta\phi$ of crystal axes satisfies $\Delta\phi \leqq 9$ degrees.

A crystal structure of the silver layer according to the present invention is the $\{100\}<001>$ cube texture, and the deviating angle $\Delta\phi$ of crystal axes, which is an index of the orientation (orientation degree), is $\Delta\phi \leqq 9$ degrees. In the present invention, metallic crystals composing the silver layer are biaxially oriented. Specifically, the face $\{100\}$ is approximately parallel to the surface of the substrate, an axis $<001>$ is oriented approximately parallel to a longitudinal direction of the substrate surface, and the deviating angle is 9 degrees or less. This is because the deviating angle $\Delta\phi$ needs to be controlled to 9 degrees or less, in order to form an epitaxial thin film having higher quality. The $\Delta\phi$ is preferably as small as possible and is ideally 0 degree, that is to say, crystals have no deviation of crystal axes among them. However, when considering production possibility, the $\Delta\phi$ is preferably 0.1 degrees or more.

An orientation substrate for forming an epitaxial thin film according to the present invention has an approximately flat bonded interface of a silver layer with a metallic layer, and the waviness is preferably in a range of 1 to 500 nm. When the unevenness of the bonded interface is large, the silver layer shall have ununiform thickness. Particularly when the silver layer is thin, even the slight unevenness makes the thickness of the silver layer ununiform, and consequently gives a harmful influence on an epitaxial thin film to be grown on the silver layer. Accordingly, the bonded interface between the metallic layer and the silver layer is preferably in a state of being sufficiently flattened and being free from such an oxide coating and an adsorbate as to obstruct the flattening of the interface. In the present invention, the waviness means the unevenness which is observed in a cross section of the bonded interface, and the dimension of the waviness means an amplitude between the top end and the bottom end of adjacent waves. A metal substrate according to the present invention has a mean value of waviness preferably in a range of 1 to 500 nm when measured through observation (SEM or TEM) for the cross section.

The silver layer also has a surface roughness Ra preferably of 10 nm or less on its surface. This is because the surface roughness of the surface of the silver layer can affect characteristics of an epitaxial thin film which will grow on the surface. The lower limit of the surface roughness is preferably as small as possible, but is preferably 0.1 nm or more when considering a working limit and efficiency.

A metallic layer which supports the above described silver layer and composes a substrate is preferably made from any of stainless steel and a nickel alloy (hastelloy alloy, inconel alloy, incoloy alloy, monel alloy and the like). The above described materials are preferred in order to secure the strength of the silver layer from the viewpoint that the metallic layer needs to have adequate strength and flexibility even having a thin sheet shape or a tape shape.

The thickness of the textured metal substrate (total thickness of silver layer and metallic layer) according to the present invention is not particularly limited, but can be set according to the thickness of an epitaxial thin film to be produced, and can cope with various shapes such as a sheet shape, a thin sheet shape and a tape shape (1 mm or less). In addition, the thickness of the silver layer and the metallic layer are not limited in particular, but the thickness of the metallic layer is preferably 40% or more of that of the whole oriented substrate in order to secure the strength. The metallic layer preferably has a thickness of 10 µm or more.

When manufacturing a textured metal substrate for forming an epitaxial thin film according to the present invention, it is necessary to make an orientation of a silver layer sufficient and make the silver layer strongly bonded with a metallic layer. As a manufacturing method for satisfying such a request, a cladding method is considered which is a method of pressure-welding a crystal-oriented silver sheet with a metal sheet which will be a metallic layer, but the method cannot achieve the original object of manufacturing an oriented substrate, because of disordering the crystal orientation of the silver layer by a pressure in pressure welding. On the other hand, a method of firstly cladding the silver sheet with the metal sheet and then heat-treating the clad to make the crystals of the silver layer oriented is considered as well, but the method cannot achieve the object of high strength, because the metal sheet is softened by heat treatment in the orienting treatment and loses the function as a reinforcing member.

The present inventors found that the following two methods are preferable for manufacturing such a clad textured metal substrate as to cope with the above described request of reliably giving the substrate both of the orientation of the crystal structure and the bonding strength between the silver layer and the metallic layer: (1) forming an oriented silver layer and cladding the silver layer with the metallic layer without the application of pressure or through the application of low pressure by using a surface activated bonding process; and (2) diffusion-bonding a silver layer which is not oriented with the metallic layer and simultaneously orienting the silver layer. The content will now be sequentially described below.

(1) Manufacturing Method Based on Surface Activated Bonding Process

The first manufacturing method according to the present invention includes the following steps:

(a) an orienting heat treatment step of hot-working a silver sheet containing 30 to 200 ppm oxygen by concentration at 50 to 300° C. at a working rate of 95% or more, and heat-treating the silver sheet obtained through the hot-working in a non-reductive atmosphere to make at least the surface part a $\{100\}<001>$ cube texture having a deviating angle $\Delta\phi$ of crystal axes satisfying $\Delta\phi \leqq 9$ degrees;
(b) a step of preparing a metal sheet; and
(c) a surface activated bonding step of dry-etching the surfaces to be bonded of the silver sheet obtained by an orienting heat treatment step and the metal sheet in a non-oxidation atmosphere to remove the oxide and adsorbate existing on the surfaces to be bonded, and then bonding the silver sheet with the metal sheet without or through the application of pressure.

The first method according to the present invention includes the step of firstly hot-working and heat-treating the silver sheet to orient the structure, as in the above described step (a). The working rate for the silver sheet is 95% or more and is preferably 97% or more. When the working rate is less than 95%, an adequate orientational structure cannot be obtained. The silver sheet is hot-worked at a working temperature of 50 to 300° C. The reason why the silver sheet is hot-worked at the working temperature is because when the silver sheet is hot-worked at a temperature lower than 50° C., the silver sheet does not form an oriented cube texture, and when the silver sheet is hot-worked at a temperature higher than 300° C., the silver sheet forms crystals having a different orientation from that of the cube texture. The silver sheet is hot-worked preferably at 130 to 200° C.

It is preferable to set a treatment temperature of orienting heat treatment (recrystallization treatment) after hot-working to 400° C. or higher but a melting point of silver or lower. When the heat treatment temperature is lower than 400° C., the silver layer may not obtain adequate orientational structure. The heat treatment temperature is set at the melting point or lower, but is preferably 800° C. or lower, and is more preferably in a range of 600 to 800° C. A heat treatment period of time is preferably in a range of 1 to 30 minutes. When the heat treatment temperature is higher than 800° C. or the heat treatment period of time is longer than 30 minutes, the groove in a crystal grain boundary may be deepened and a polishing operation may be necessary after orienting treatment in order to remove the groove.

After the silver sheet has been subjected to orienting heat treatment in this way, a metal sheet to be bonded with the silver sheet is prepared (the above described step (b)). A commercial sheet or a tape material may be directly used as the metal sheet or may be subjected to pretreatment for working such as rolling before being used as the metal sheet.

The first method according to the present invention includes employing a surface activated bonding process as a method of bonding an oriented silver layer with a metallic layer (the above described step (c)). The surface activated bonding process is a method of, as described above, removing an oxide and adsorbate on the faces (surfaces) to be bonded by dry etching, and bonding the faces immediately after having exposed a base material (pure metal) to the atmosphere. The bonding method is based on metal atomic force, which is generated between atoms (molecules) in a state of having removed all impurities such as oxides from the surfaces.

Either of etching methods using an ion beam or atom beam of Ar or the like, or using plasma can be specifically used as a method of dry etching for activating the surfaces. It is necessary to carry out the dry etching process in a non-oxidation atmosphere, and it is preferable to carry out the dry etching process particularly in a vacuum.

The surface activated bonding process can bond the materials to be bonded without the application of pressure, and can bond them as well only by overlapping them. However, it is acceptable to pressurize both materials, in order to align them or bond them more strongly. However, the pressurizing force is as low as not to deform the shape of the materials, and is preferably in a range of 0.01 to 300 MPa. The surface activated bonding process can bond the material at room temperature. Accordingly, it is not necessary to heat the working atmosphere in a bonding operation. When the materials are being dry-etched, the temperature on the surface of the materials may rise, but the temperature rise is different from heating for the bonding operation. It is preferable to make the atmosphere non-oxidative when the materials are bonded, as well.

(2) Method Including Diffusion Bonding Process

A second manufacturing method according to the present invention includes the following steps:

(a) a step of hot-working a silver sheet containing 30 to 2,000 ppm oxygen by concentration at 50 to 300° C. at a working rate of 95% or more;
(b) a step of preparing a metal sheet; and
(c) an orienting treatment step of bringing the surface of the silver sheet hot-worked in the step (a) in contact with the metal sheet prepared in the step (b), and heating them at 400° C. or higher but a melting point of silver or lower to diffusion-bond the silver sheet with the metal sheet and simultaneously make at least the surface part of the silver sheet a {100}<001> cube texture having a deviating angle $\Delta\phi$ of crystal axes satisfying $\Delta\phi \leq 9$ degrees.

The second method according to the present invention does not orient the silver sheet before a cladding operation. In other words, the step (a) of hot-working the silver sheet is a step of controlling the shape as a substrate and pretreating the silver sheet for the subsequent orientation step. However, because the step (a) is a pretreatment step for the orientation, the silver sheet is hot-worked preferably at the same working rate, heat treatment temperature or the like as in the first method. The step (b) is set similarly.

The manufacturing method is provided such that the diffusion bonding of the silver sheet and the metal sheet and the orientation of the silver sheet are simultaneously conducted in the step (c). The diffusion bonding process is a process of utilizing the diffusion of atoms between materials to be bonded occurring when having heated the materials, and can bond them by the application of a low pressure. The present inventors found that the crystal structure of a metal material of silver is oriented simultaneously when the atoms are diffused to and from a metal sheet, in a temperature range at which the silver can be diffusion-bonded.

This diffusion bonding and orienting treatment includes the steps of: subjecting both sheets to pretreatment such as degreasing as needed; aligning both of the sheets with each other in a non-reductive atmosphere such as nitrogen gas atmosphere; and heating them at a heating temperature of 400° C. to a melting point for a predetermined time while applying a fixed pressure to them. Both of the sheets are more preferably heated at 700 to 900° C. for 10 to 30 minutes; and are preferably pressurized, for instance, with a pressure of 0.5 to 100 kPa, because it is preferable to set an upper limit of the pressurizing force so that a biaxial-oriented crystal structure may not be destroyed. Thereby, both of the sheets can be strongly bonded by atomic diffusion at the interface, and the silver sheet can obtain an orientational structure.

A clad textured metal substrate comprising the silver layer having the crystal-oriented structure at least on the surface part and a metallic layer can be manufactured through any of the above described two manufacturing methods.

Incidentally, an amount of oxygen contained in the silver sheet is limited when the above described two manufacturing methods are employed. This is based on the finding by the present inventors that a predetermined amount or more of oxygen is necessary in order to make the crystal structure of the silver layer sufficiently oriented. The reason why the oxygen content is related with the orientation is not clear, but the silver sheet containing 30 ppm or less oxygen cannot form a completely oriented structure by employing any working and heat treatment conditions. On the other hand, when more than 200 ppm of oxygen is contained in the material, a part of oxygen is not dissolved in the matrix and may cause the inconvenience of forming a flaw such as a pinhole in the material. A preferable oxygen content is in a range of 50 to 200 ppm. The oxygen in the silver sheet spreads out into the atmosphere in a subsequent heat treatment (orienting heat treatment and diffusion bonding), so that oxygen concentration in the oriented silver sheet decreases in comparison with that of a silver sheet before heat treatment. The silver sheet contains preferably as few impurities as possible except oxygen, and contains silver preferably in a purity of 99.9% or higher.

It is possible to manufacture a silver sheet of a single layer, which is not cladded with a metal sheet but has a crystal orientation, by limiting the oxygen concentration according to the above described relationship between the oxygen concentration and the crystal orientation of silver.

Furthermore, in the present invention, a surface roughness Ra of the surface (surface on which epitaxial film will be grown) of a silver layer is preferably 10 nm or less, so that it is preferable to appropriately treat the surface of the silver layer. The surface roughness of the surface of the silver layer is preferably adjusted by polishing the surface with any method of an electrolytic polishing method, a mechanical polishing method, a chemically polishing method including a chemical polishing method, a chemo mechanical polishing method and the like, and an electro-composite polishing method including an electro-abrasive polishing method, electromechanical polishing method and the like. At least the surface of the silver sheet after having been subjected to orienting treatment (in the case of the above described second method, the silver sheet after having been bonded) is preferably polished. Alternatively, it is acceptable to polish the silver sheet before and after finish rolling prior to the orienting treatment, and polish the silver sheet again after the orienting treatment (after bonding).

The clad substrate according to the present invention preferably has a small waviness of the interface between the silver layer and the metallic layer. The waviness can be controlled by flattening a reduction roll to be used when the silver sheet and the metal sheet are rolled. A surface activated or diffused bonding process can bond the sheets without the application of pressure or through the application of low pressure, accordingly can keep surfaces to be bonded flat by previously flattening the surfaces before bonding them. In this regard, the sheets are preferably finish-rolled in a rolling process, by using a lapping roll made from cemented carbide which is hard to produce waviness. Alternatively, the sheets may be polished by using the above described polishing method.

As discussed above, a substrate for forming an epitaxial thin film thereon according to the present invention has a metallic layer cladded on a silver layer having an orientational structure, and accordingly has a higher strength than a conventional substrate. A manufacturing method according to the present invention can stably form a thin film of high quality without damaging the substrate, in a process of forming the epitaxial thin film such as a superconducting film onto the substrate.

DETAILED DESCRIPTION OF THE PREFERRED EMBODIMENTS

Preferred embodiments according to the present invention are described below with reference to the drawings.

First Embodiment

Here, a clad textured metal substrate was manufactured with a method including a surface activated bonding process. A tape-shaped silver sheet with a thickness of 600 μm was prepared (concentration of contained oxygen; 50 ppm) and was hot-rolled into a thickness of 30 μm at 150° C. with a reduction roll at a reduction rate set at 95%. Thus rolled silver sheet was chemomechanically polished with the use of chromic acid-hydrochloric acid polishing liquid for 30 seconds. Afterwards, the chemomechanically polished silver sheet was heat-treated so that the crystal structure was oriented. In the heat treatment step, the silver sheet was heated in a non-reductive atmosphere at 800° C. for 30 minutes.

Next, a metal sheet to be cladded with the above described silver sheet was prepared. The prepared metal sheet was a stainless steel sheet (SUS304) which had been rolled into a tape shape with a thickness of 100 μm beforehand. Then, the silver sheet and the metal sheet were cladded by a surface activated bonding method with the use of a surface activated bonding apparatus 100 which is described below.

Figure 1:
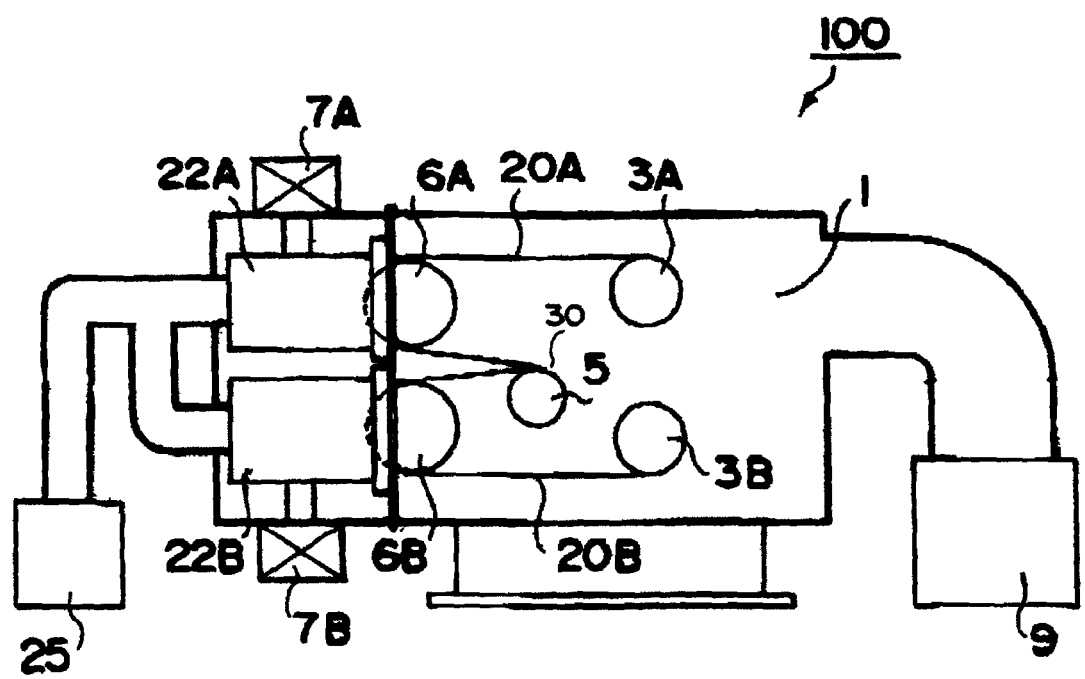
FIG. 1 is a schematic view of a surface activated bonding apparatus in the present embodiment.

FIG. 1 illustrates a schematic view of a surface activated bonding apparatus 100 used in First Embodiment. The surface activated bonding apparatus 100 is a vacuum apparatus, and is partitioned into etching chambers 22A, 22B and a vacuum tank 1. The vacuum tank 1 and the etching chambers 22A and 22B are also connected to exhaust pump units 9 and 25 respectively. Parts of electrode rolls 6A and 6B project into the etching chambers 22A and 22B respectively, and are vacuum-sealed there. Thus, the electrode rolls 6A and 6B are placed in the vacuum tank. Electrodes (not shown) for passing an electric current to the electrode rolls 6A and 6B are provided on outer walls of the etching chambers 22A and 22B. Power supply units 7A and 7B are installed so as to apply high voltage between respective electrodes. In the vacuum chamber 1, wind-off reels 3A and 3B are installed so as to wind off a silver sheet 20A and a metal sheet 20B which are to be dry-etched. In addition, a wind-up roll 5 is installed so as to wind up the silver sheet 20A and the metal sheet 20B which were dry-etched and bonded with each other.

The surface activated bonding apparatus 100 makes the wind-off reels 3A and 3B wind off the silver sheet 20A and the metal sheet 20B, hang the sheets on the peripheral surfaces of electrode rolls 6A and 6B respectively, applies high voltage to the sheets in etching chambers 22A and 22B, thereby makes an inert gas such as argon gas sealed in the room generate glow discharge, and makes the molecules of the inert gas sputter the surfaces of the silver sheet 20A and the metal sheet 20B due to high voltage to etch the surfaces. Thus, the bonding apparatus removes an oxide and adsorbate on the surfaces to make the surfaces clean and flat. Then, the activated silver sheet 20A and metal sheet 20B are bonded along with the operation of the wind-up roll 5, and a clad textured metal substrate 30 is manufactured. In the present embodiment, conditions of dry etching were set as described below.

Etching method: Ar beam etching
Vacuum degree: $10^{-5}$ Pa
(under argon gas atmosphere in vacuum tank and etching chamber)
Applied voltage: 2 kV
Etching period of time: 5 minutes
Pressurizing force in cladding operation: 2 MPa Thus manufactured clad textured metal substrate was collected, and the surface of the silver layer was chemomechanically polished in a similar condition to the above described one. Then, the state of orientation of the silver layer and the bonded interface were confirmed.

Second Embodiment

A clad textured metal substrate was manufactured by using a diffusion bonding method. The same silver sheet as in First Embodiment was hot-worked and chemomechanically polished, and the same stainless steel sheet as in First Embodiment was prepared. Then, the sheets were diffusion-bonded.

In the diffusion bonding step (orienting treatment step), each of the silver sheet and the stainless steel sheet was drawn out from two wind-off reels which have wound up the respective sheets thereon, and was heated while having been overlapped in between opposing rolls. At this time, the sheets were heated at 800° C. for three minutes, and were pressurized to each other at a pressurizing force of 1 kPa. Thereby, the silver sheet and the stainless steel sheet were bonded, and the crystals of the silver sheet were oriented.

Comparative Example 1

A clad textured metal substrate was manufactured by heat-treating the same silver sheet as in First Embodiment at 300° C. instead of 800° C. and on the same conditions as in First Embodiment to orient the crystals.

Figure 2:
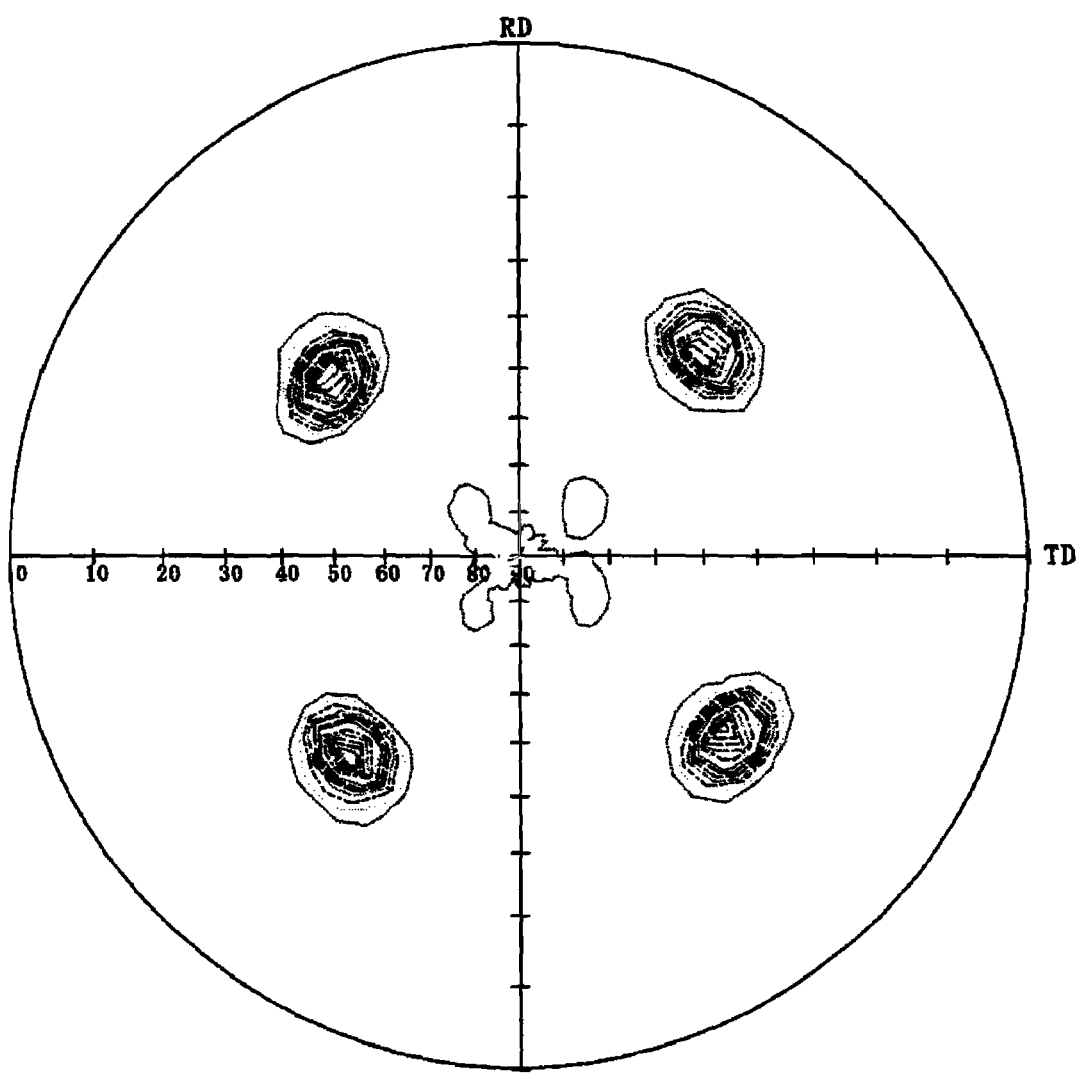
FIG. 2 is an X-ray pole figure of a silver layer surface of a clad textured metal substrate according to First Embodiment.
Figure 3:
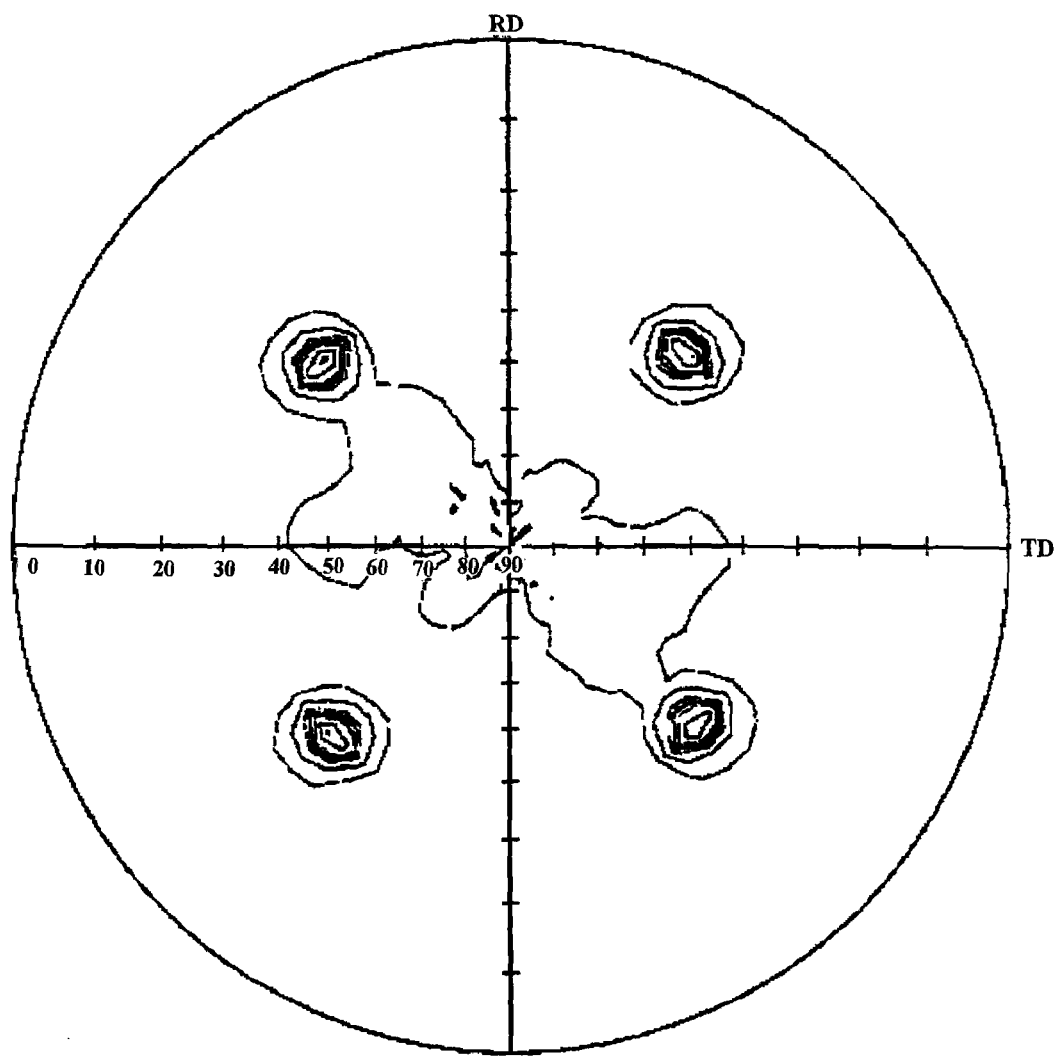
FIG. 3 is an X-ray pole figure of a silver layer surface of a clad textured metal substrate according to Second Embodiment.
Figure 4:
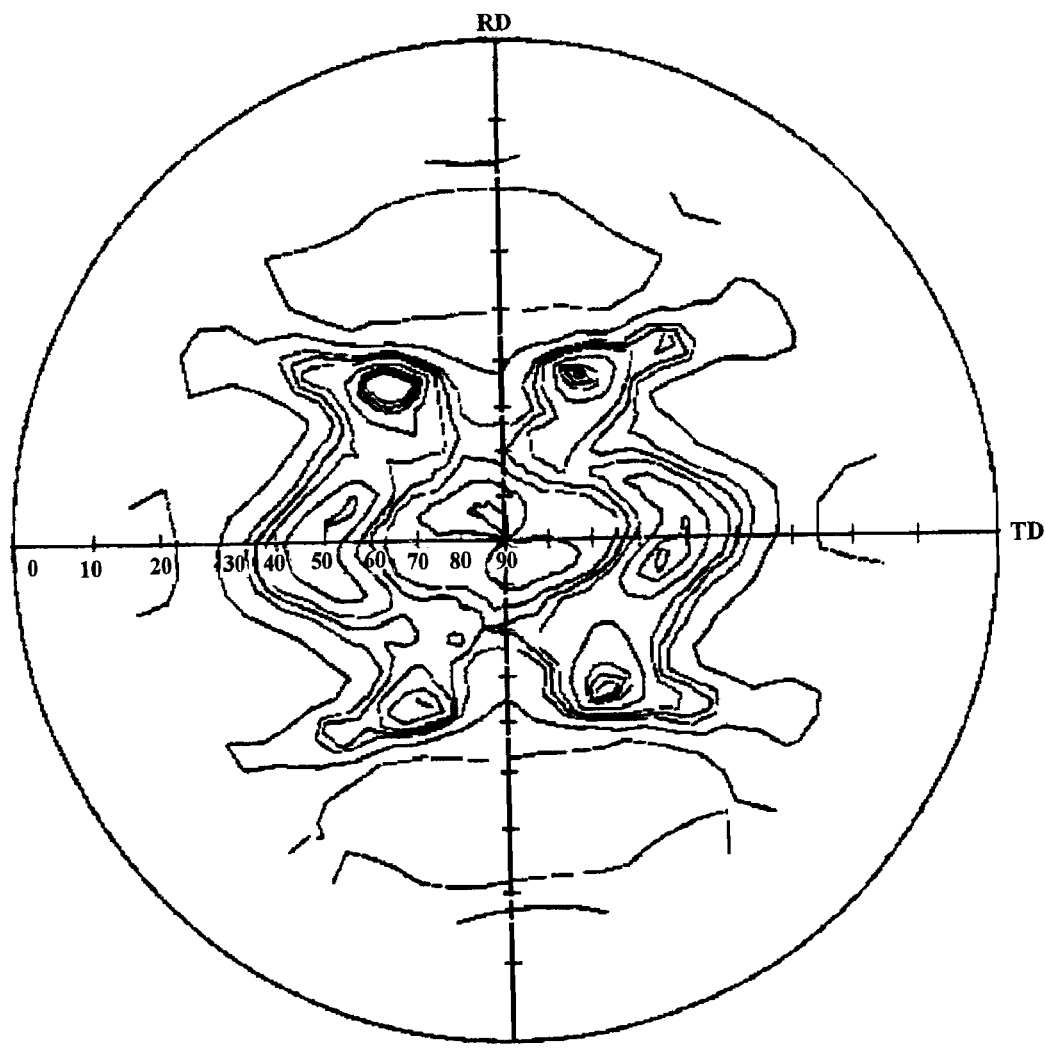
FIG. 4 is an X-ray pole figure of a silver layer surface of a clad textured metal substrate according to Comparative Example 1.

Evaluation on orientation; The orientation of a silver layer was examined on clad textured metal substrates for forming an epitaxial thin film thereon, which were manufactured in the above examples. The orientation was examined by using an X-ray pole figure analysis (XPFA). FIG. 2 to FIG. 4 illustrate an X-ray pole figure of an (111) face of each sample. As is understood from the figures, the silver layer of clad textured metal substrates for forming an epitaxial thin film thereon manufactured in both embodiments clearly show four independent peaks. From the result, it was confirmed that the silver layer has adequate orientation (FIGS. 2 and 3). In addition, a deviating angle Δϕ was determined from the full width at half maximum (FWHM) of a peak obtained from a ϕ scanning result. As a result, the deviating angles Δϕ of the silver layer of the above described sample both were 8.0 degrees. On the other hand, Comparative example 1 (FIG. 4) does not show such a clear peak as described above. Thus, it was confirmed that Comparative example 1 did not have satisfactory orientation.

Figure 5:
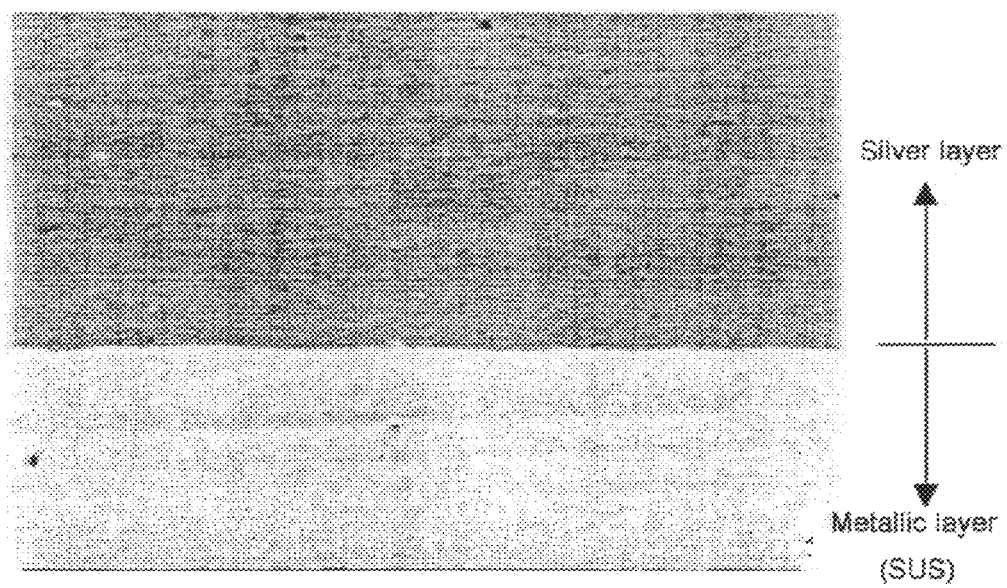
FIG. 5 is a sectional photograph showing a bonded interface between a silver layer and a metallic layer of a clad textured metal substrate according to First Embodiment.

Evaluation of bonded interface: FIG. 5 is a photograph showing the bonded interface of a clad textured metal substrate according to First Embodiment (magnification of 5,000 times). As is understood from FIG. 5, the interface between a silver layer and a metallic layer was approximately flat. The smoothness was 300 nm or less.

Figure 6:
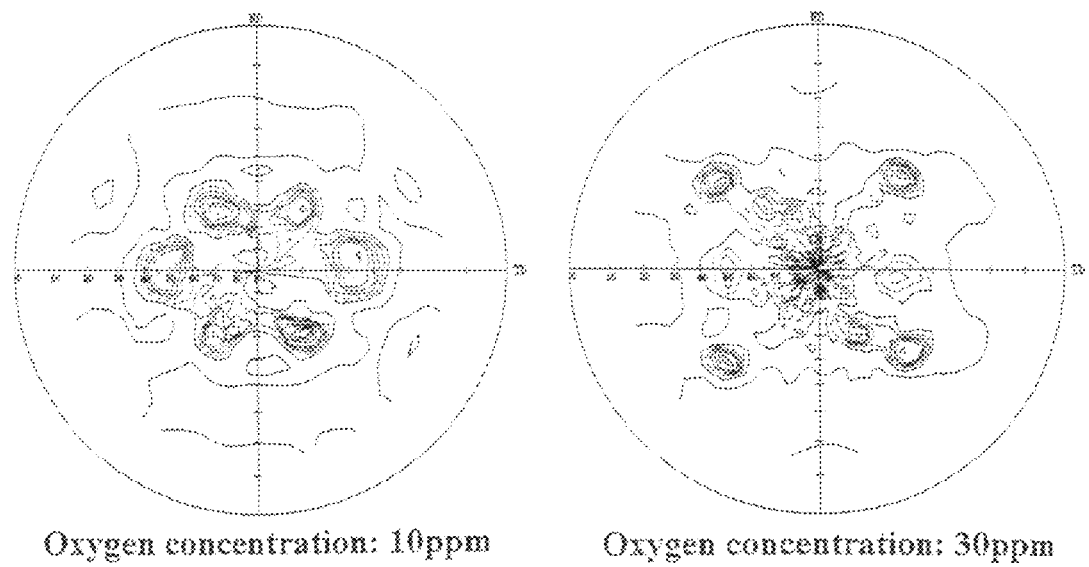
FIG. 6 is an X-ray pole figure of the surface of respective silver layers containing 10 ppm and 30 ppm oxygen of a silver sheet by concentration.

Examination of oxygen content: A relationship between a concentration of oxygen contained in a silver sheet and the orientation of the silver sheet appearing when silver sheet is heat-treated for orientation was examined. Two silver sheets containing 10 ppm and 30 ppm oxygen by concentration were prepared in the step of manufacturing a substrate in First Embodiment, and clad substrates were manufactured by treating the respective silver sheets in the same step as in First Embodiment. Then, the surfaces of each silver layer were examined by using an X-ray pole figure analysis. FIG. 6 shows the result. From FIG. 6, it is understood that the silver sheet containing 10 ppm oxygen by concentration keeps a composite structure which is not oriented at all even after having been heat-treated. The crystals of the silver sheet are oriented when the oxygen concentration reached 30 ppm. Accordingly, it is understood that the silver sheet needs to contain at least 30 ppm oxygen by concentration and more preferably contain 50 ppm or more oxygen by concentration as in First Embodiment (FIG. 2). For information, a central waveform in FIG. 6 which illustrates the pole figure of the silver sheet containing 30 ppm oxygen by concentration is a back ground. Accordingly, when eliminating the back ground, it is understood that sufficient orientation is secured in the sample.

What is claimed is:

1. A clad textured metal substrate for forming an epitaxial thin film thereon comprising a metallic layer and a silver layer which is bonded to at least one face of the metallic layer, wherein the silver layer has a $\{100\}<001>$ cube texture in which a deviating angle $\Delta\phi$ of crystal axes satisfies $\Delta\phi \leqq 9$ degrees; and wherein the metallic layer and the silver layer form an approximately flat bonded interface of which the waviness is in a range of 1 to 500 nm.

2. The clad textured metal substrate for forming the epitaxial thin film thereon according to claim 1, wherein the silver layer has a surface roughness Ra of 10 nm or less.

3. The clad textured metal substrate for forming the epitaxial thin film thereon according to claim 1, wherein the metallic layer is made from stainless steel or a nickel alloy.

4. The clad textured metal substrate for forming the epitaxial thin film thereon according to claim 2, wherein the metallic layer is made from stainless steel or a nickel alloy.

* * * * *